United States Patent
Desai et al.

(10) Patent No.: US 11,923,668 B2
(45) Date of Patent: Mar. 5, 2024

(54) SPLICE FOR CABLE TRAY AND CABLE TRAY ASSEMBLY INCLUDING SAME

(71) Applicant: Eaton Intelligent Power Limited, Dublin (IE)

(72) Inventors: Jayram Shivajirao Desai, Kolhapur (IN); Lalit Subhash Khairnar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/737,509

(22) Filed: May 5, 2022

(65) Prior Publication Data

US 2022/0360061 A1   Nov. 10, 2022

Related U.S. Application Data

(60) Provisional application No. 63/184,531, filed on May 5, 2021.

(51) Int. Cl.
*H02G 3/06*    (2006.01)
*F16B 7/04*    (2006.01)
*F16L 3/26*    (2006.01)

(52) U.S. Cl.
CPC ........... *H02G 3/0608* (2013.01); *F16B 7/042* (2013.01); *F16L 3/26* (2013.01)

(58) Field of Classification Search
CPC ....... H02G 3/0608; F16B 7/042; F16B 21/02; F16B 5/0092; F16L 3/26
USPC ............... 248/49, 221.12; 411/552, 347, 549
See application file for complete search history.

(56) References Cited

U.S. PATENT DOCUMENTS

| | | | | |
|---|---|---|---|---|
| 1,803,431 | A * | 5/1931 | Hill ...................... | B60R 13/105 24/453 |
| 5,361,925 | A * | 11/1994 | Wecke .................... | H02G 3/14 220/325 |
| 6,267,543 | B1 * | 7/2001 | David .................... | F16B 21/02 411/549 |
| 7,607,553 | B2 * | 10/2009 | Weber ................... | H02G 3/086 174/562 |
| 9,024,188 | B2 * | 5/2015 | Lacey, Jr. ............. | H02G 3/0608 174/68.3 |
| 2010/0086348 | A1 * | 4/2010 | Funahashi ............ | H02G 3/0456 403/306 |
| 2012/0312761 | A1 * | 12/2012 | White .................. | H02G 3/0608 403/205 |

(Continued)

*Primary Examiner* — Christopher Garft
(74) *Attorney, Agent, or Firm* — Stinson LLP

(57) ABSTRACT

The present disclosure provides a cable tray assembly comprising a cable tray splice, first cable tray section, and second cable tray section adjacent the first cable tray section with both sections having a bottom wall. The cable tray splice couples to the bottom walls. The cable tray splice may include at least two fasteners and a splice body configured to engage adjacent cable tray sections. The fasteners are configured to couple the splice body to the adjacent cable tray sections and include a spring producing a biasing force against the splice body. The disclosure provides a method to form a cable tray assembly including positioning the two cable tray sections end-to-end, positioning a splice body on bottom walls of the two cable tray sections, inserting a fastener through aligned openings in the splice body and the bottom walls, and applying a spring biasing force to the splice body.

16 Claims, 19 Drawing Sheets

(56) References Cited

U.S. PATENT DOCUMENTS

2013/0183086 A1* 7/2013 Wang .................... F16B 5/0642
                                                        403/327
2015/0322987 A1* 11/2015 Romano .................. H02G 3/32
                                                          248/49

* cited by examiner

SPLICE FOR CABLE TRAY AND CABLE TRAY ASSEMBLY INCLUDING SAME

FIELD OF THE DISCLOSURE

The present disclosure generally relates to a splice for a cable tray and a cable tray assembly including the same.

BACKGROUND OF THE DISCLOSURE

Cable tray is used by industry to support electrical cable. In one design, a length or section of cable tray comprises a pair of side walls and a bottom wall. The side walls and bottom wall may be formed from sheet metal, and may be integrally formed. Multiple cable tray sections can be coupled or spliced together, end-to-end, to form a cable tray assembly, also known as a cable tray run. Typically, the side walls of adjacent cable tray sections are spliced together using cable tray splices. These cable tray splices may include a plate and bolts for fastening the plate to the adjacent side walls of the adjacent cable tray sections.

SUMMARY OF THE DISCLOSURE

In one aspect, the present disclosure relates to a cable tray assembly comprising a first cable tray section including a bottom wall, a second cable tray section adjacent the first cable tray and including a bottom wall, and a cable tray splice coupled to the bottom walls of the first and second cable tray sections to splice together the first and second cable trays and form the cable tray assembly.

Also provided herein is a cable tray splice for splicing together cable tray sections to form a cable tray assembly. The cable tray splice comprising a splice body configured to engage adjacent cable tray sections. The splice body defines at least two openings and at least two fasteners configured to be inserted into the respective at least two openings to couple the splice body to the adjacent cable tray sections. Each of the fasteners includes a spring producing a biasing force against the splice body to inhibit movement of the cable tray splice relative to the adjacent cable tray sections.

A further aspect of the present disclosure is directed to a method of splicing together two cable tray sections to form a cable tray assembly. The method comprises positioning the two cable tray sections end-to-end, positioning a splice body on the bottom walls of the two cable tray sections, and inserting a fastener through aligned openings in the splice body and the bottom wall of the two cable tray sections. After said inserting, a spring biasing force is applied to the splice body to inhibit the fastener from moving relative to the splice body.

DETAILED DESCRIPTION OF THE DISCLOSURE

In general, the present disclosure relates to a cable tray assembly including different embodiments of a cable tray splice for splicing together cable tray sections to form the cable tray assembly. A method of splicing together cable tray sections is also described. In general, the illustrated cable tray splices are configured to be coupled to bottom walls of the cable tray sections, although it can be understood that the cable tray splices can be configured to couple to the side walls of the cable tray sections in other embodiments.

First Embodiment

Figure 1:
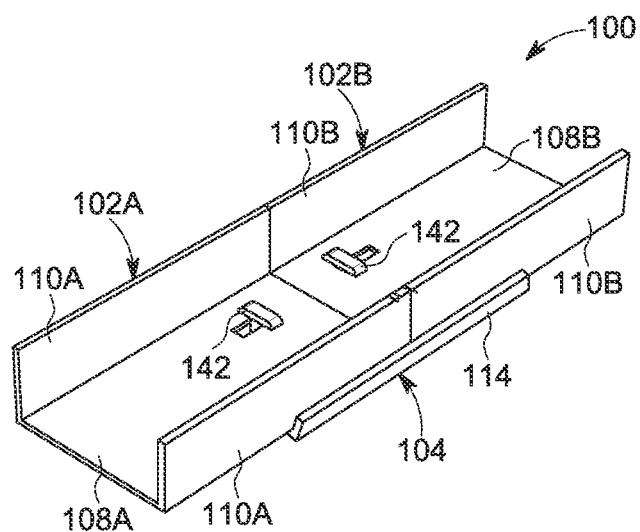
FIG. 1 is a perspective of a first embodiment of a cable tray assembly including a first embodiment of a cable tray splice.
Figure 2:
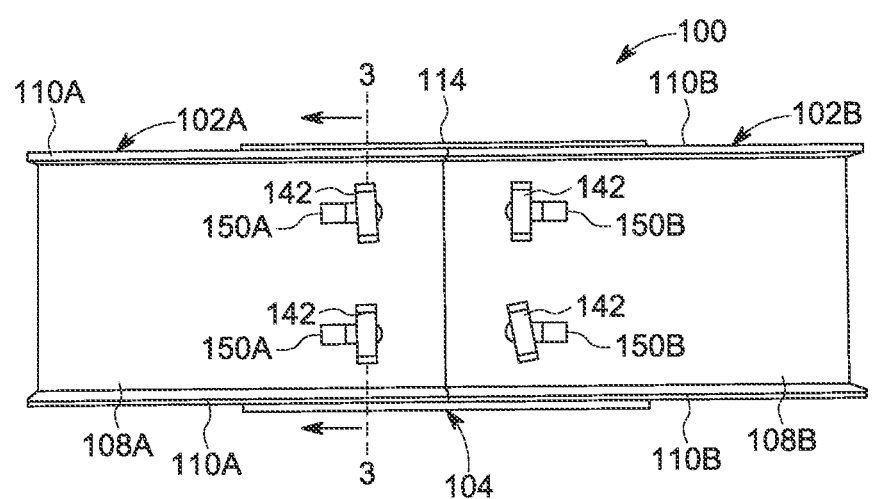
FIG. 2 is a top plan view of the cable tray assembly.

Referring to FIGS. 1 and 2, an illustrated embodiment of a cable tray assembly, which is assembled and constructed according to the teachings of the present description, is generally indicated at reference numeral 100. In general, the cable tray assembly 100 includes at least two cable tray sections (e.g., first and second cable tray sections, generally indicated at 102A, 102B, respectively), and a cable tray splice, generally indicated at reference numeral 104, splicing or coupling the first and second cable trays to one another. Longitudinal ends of the cable tray sections 102A, 102B generally abut or oppose one another. In the illustrated embodiment, each of the cable tray sections 102A, 102B includes a bottom wall 108A, 108B, and opposing side walls 110A, 110B extending upward from the bottom wall.

Figure 3:
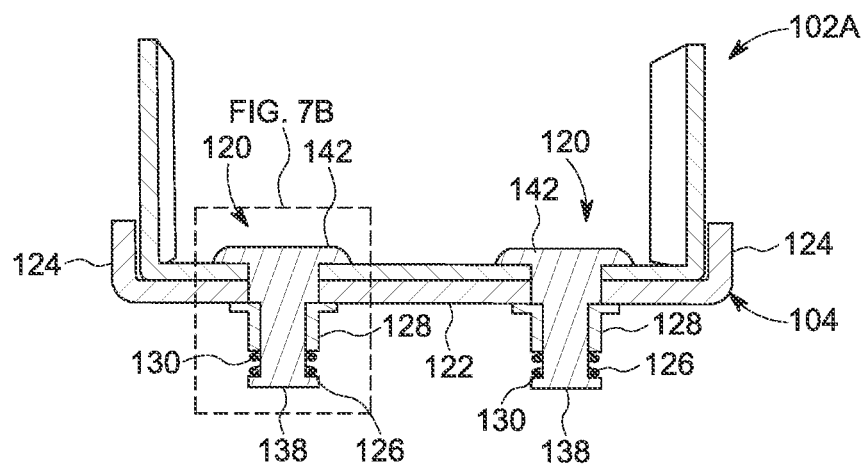
FIG. 3 is a cross section of the cable tray assembly taken through the line 3-3 in FIG. 2.
Figure 4:
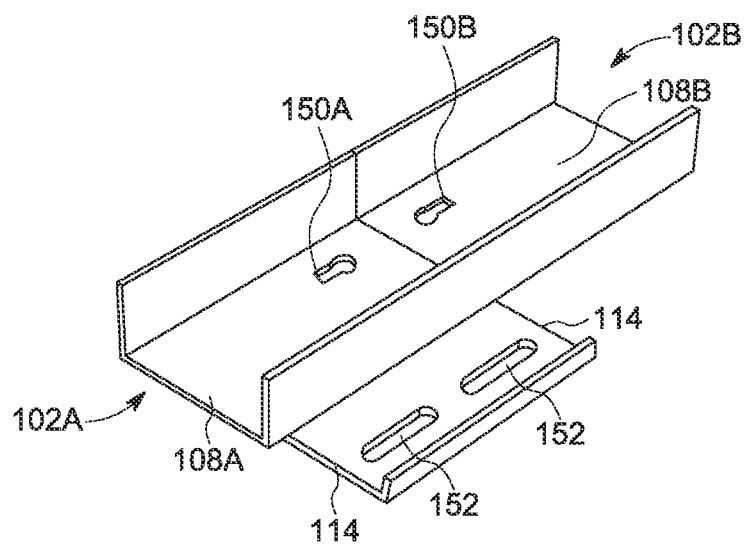
FIG. 4 is similar to FIG. 1, except with splice fasteners of the cable tray splice removed therefrom, and a splice plate partially removed from cable tray sections.
Figure 7A:
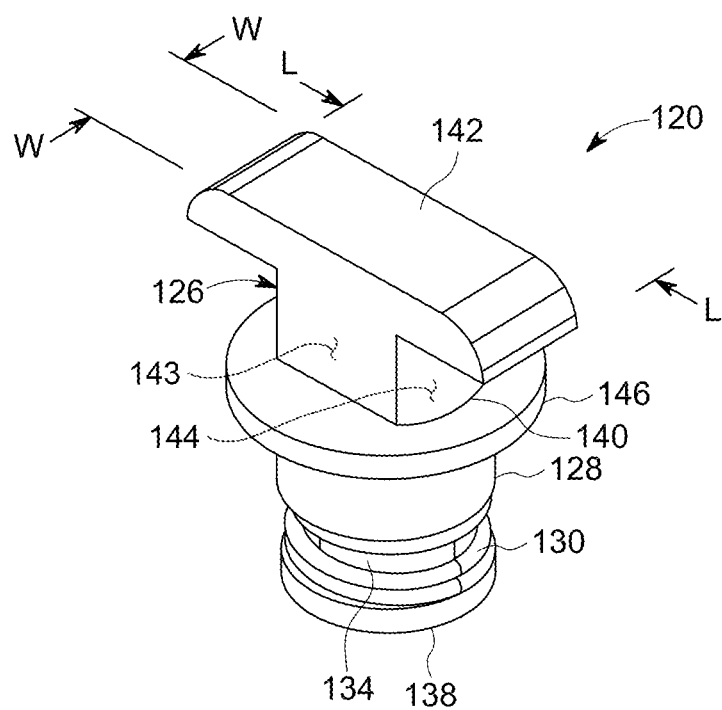
FIG. 7A is an enlarged perspective of the splice fastener.
Figure 7B:
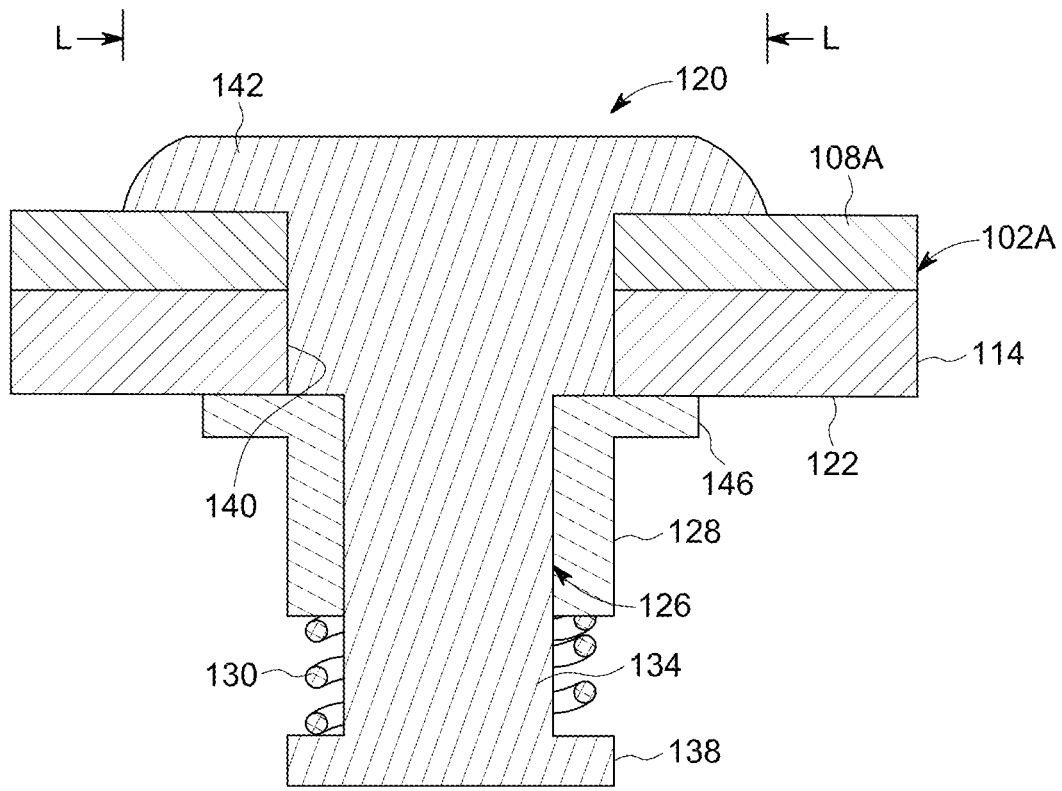
FIG. 7B is an enlarged, detail view as indicated in FIG. 3.
Figure 7C:
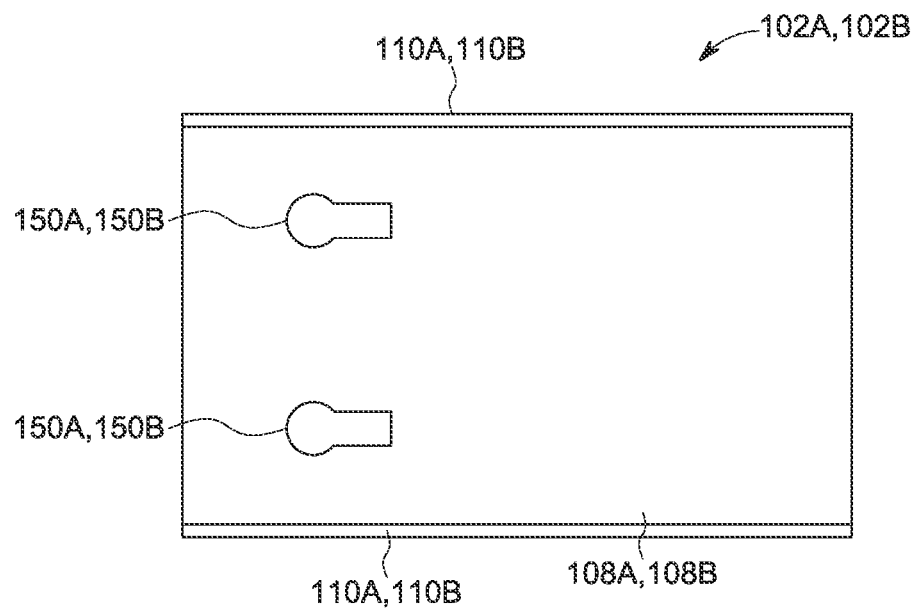
FIG. 7C is a top plan view of one of the cable tray section.
Figure 8:
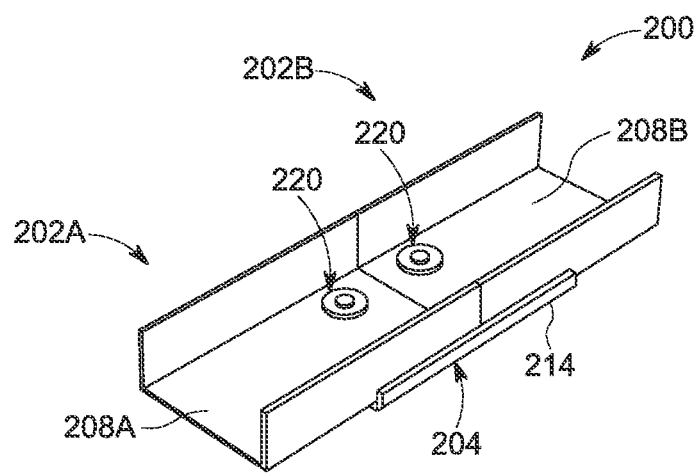
FIG. 8 is a perspective of a second embodiment of a cable tray assembly including a second embodiment of a cable tray splice.

Referring to FIGS. 3 and 7B, in particular, the illustrated splice 104 is configured to couple to the bottom walls 108A, 108B of the adjacent cable tray sections 102A, 102B to splice the tray sections together. It is understood that in other embodiments, the splice may be used to couple the adjacent side walls 110A, 11B to one another. As seen best in FIG. 3, the illustrated splice 104 includes a splice plate 114 (broadly, a splice body) and at least one fastener (e.g., four fasteners 120 as shown in FIG. 2) coupling the splice plate 114 to the bottom walls 108A, 108B of the cable tray sections 102A, 102B. The illustrated splice plate 104 has a bottom wall 122 configured to oppose, such as in face-to-face engagement with, the lower or outer surfaces of the bottom walls 108A, 108B, and opposing side walls 124 configured to oppose, such as in face-to-face engagement with, the corresponding side walls 110A, 110B of the cable tray sections 102A, 102B. The splice body 114 may be formed from metal, plastic, or other material. The splice body may be of other shapes and configurations suitable for splicing the two cable tray sections 102A, 102B to one another.

The illustrated splice fasteners 120 are quick-connect fasteners configured to quickly lock the splice plate 114 onto the adjacent cable tray sections 102A, 102B. The splice fasteners 120 may be identical. As explained below, each splice fastener 120 functions as a male twist-lock which is insertable through aligned openings in the bottom walls 122, and 108A, 108B of the respective splice plate 114 and cable tray sections 102A, 102B. Referring to FIGS. 7A and 7B, the splice fastener 120 includes a stem, generally indicated at 126, a collar 128 received on the stem and axially slidable along the length of the stem, and a spring 130 (or other biasing element) configured to bias the collar in a locked position. The stem 126 has a length and includes a stem body 134 extending axially along its length. A lower flange 138 extends laterally outward from a lower end portion of the stem body 134. An enlarged upper shoulder 140 extends laterally outward from an upper end portion of the stem body 134. The upper shoulder 140 has a length and a smaller width. And a head 142 at an upper portion of the upper shoulder 140 has an elongate shape with a length L extending laterally outward from the longitudinal ends of the upper shoulder (along the length of the upper shoulder 140) and a smaller width W transverse of the length (along the width of the upper shoulder). The width W of the head 142 and the upper shoulder may be substantially equal and defining flat opposite sides 143 of the stem. Overall, the stem 126 may be generally T-shaped.

The collar 128 is slidably received on the stem body 134 between the lower flange 138 and the upper shoulder 140. The illustrated collar 128 includes an upper flange 146, although the collar may have a uniform diameter in other embodiments. The spring 130 (e.g., compression spring) engages a lower portion of the collar and the lower flange 130 to produce a biasing force biasing the collar 128 in an upward, locked position, whereby when coupling the splice plate 114 to the cable tray sections 102A, 102B, the splice plate and cable tray sections are sandwiched between the head 142 and the collar 128 (e.g., the flange 146 of the collar), as seen best in FIG. 7B. It will also be understood by the skilled person that a biasing force can be achieved in a number of ways known to those skilled in the art, such as through spring loaded mechanisms, cam action-based handle design, hand operated threaded knob designs, lynch pin based designs, and the like.

As seen best in FIGS. 4-7 and 7C, the bottom wall 108A, 108B of each of the cable tray sections 102A, 102B defines at least one (e.g., two) openings 150A, 150B, and the bottom wall 122 of the splice plate 114 defines openings 152 (e.g., four openings) alignable with the openings 150A, 150B of the cable tray sections. In the illustrated embodiment, the openings 150A, 150B in the cable tray sections 102A, 102B are generally keyhole shaped having generally rectilinear portion and an enlarged rounded end portion. Also, the openings 152 in the splice plate 114 are generally elongate (e.g., slot shaped) having lengths extending lengthwise of the splice plate.

Figure 5:
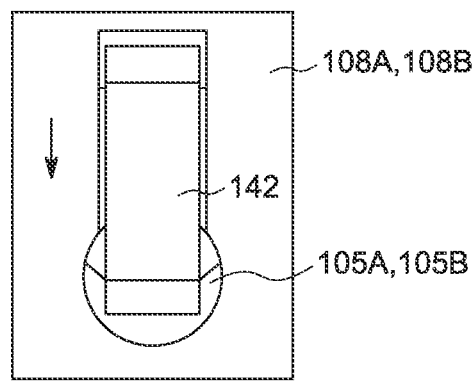
FIG. 5 is an enlarged, partial top plan view of the fastener in an unlocked orientation and inserted into a keyhole opening of one of the cable tray sections.
Figure 6:
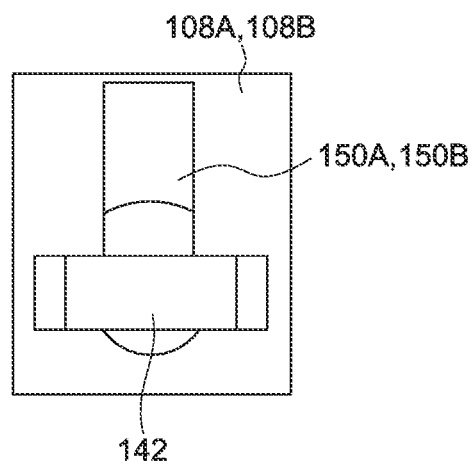
FIG. 6 is similar to FIG. 5 but with the splice fastener rotated 90 degrees to a locked orientation in the keyhole opening.

To couple the splice plate 114 to the cable tray sections 102A, 102B, the corresponding openings 150A, 150B and 152 are first aligned, and then the fasteners 120 are locked in the aligned openings. To lock each fastener 120, the fastener is first orientated and positioned so that the length of the head 142 (and the length of the upper shoulder 140) extends along the lengths of slots 152 and the keyhole openings 150A, 150B. The fastener 120 is then inserted through the bottom 122 of the splice plate 114 and then the bottom 108A, 108B of the corresponding cable tray section 102A, 102B. As the head 142 of the fastener 120 exits the aligned openings 152 and 150A, 150B and clears the upper or inner surface of the bottom wall 108A, 108B, the collar 128 (e.g., the flange 146) engages the lower or outer surface of the splice plate 114 and slides downward on the stem body 134 against the biasing force of the spring 130. As shown in FIG. 5, once the head 142 is through the openings 152 and 150A, 150B, the fastener 120 can be slid or moved axially within the aligned openings 152 and 150A, 150B toward the enlarged rounded end portion of the keyhole opening. In this position, the upper shoulder 140 of the stem 126 is received in the rounded end portion of the keyhole opening 150A, 150B. As explained above, the width of the upper shoulder 140 is substantially equal to or less than the width of the head 142. This allows the upper shoulder 140 to enter the openings 152 and 150A, 150B, including the rounded end portions of the keyhole opening 150A, 150B. Once the upper shoulder 140 is received in the rounded end portion of the keyhole opening 150A, 150B, the stem 126 (or at least the head 142 and upper shoulder 140) is rotated about 90 degrees about its axis, as shown in FIG. 6. The collar 128 may also rotate with the stem 126. The upper shoulder 140 has rounded longitudinal ends 144 which fit snugly within the enlarged rounded end of the keyhole opening 150A, 150B as the stem 126 is rotated 126 to thereby "lock" the stem in the keyhole opening by virtue of the corresponding shapes of the upper shoulder 140 and the enlarged rounded end of the keyhole opening inhibiting the stem and the fastener from moving out of the enlarged rounded end of the keyhole opening and sliding or moving lengthwise of the cable tray sections 102A, 102B.

Upon releasing one's grip on the fastener 120 in the locked position, the collar 128 rebounds along the stem 126 toward its biased position under the force of the spring 130 and engages the bottom wall 122 of the splice plate 114, as shown in FIG. 7B. This spring force produces frictional engagement between the head 142 of the stem 126 and the cable tray section 102A, 102B and between the collar 128 (e.g., flange 146) and the bottom wall of the splice plate 114. These frictional forces inhibit rotation of the stem 128 and the fastener 120 as a whole about its axis relative to at least the cable tray sections 102A, 102B, thereby inhibiting the fastener from inadvertently rotating 90 degrees and disengaging from the keyhole opening 150A, 150B.

Second Embodiment

Referring to FIGS. 8-12, another embodiment of a cable tray assembly is generally indicated at reference numeral 200. The cable tray assembly 200 may be similar to the first cable tray assembly 100, with the exception of the cable tray assembly including a different splice, generally indicated 204, and different openings 250A, 250B in the cable tray sections 202A, 202B. Other than these differences, the cable tray assemblies 100, 200 may be identical with identical and similar components indicated by corresponding reference numerals plus 100.

Figure 9:
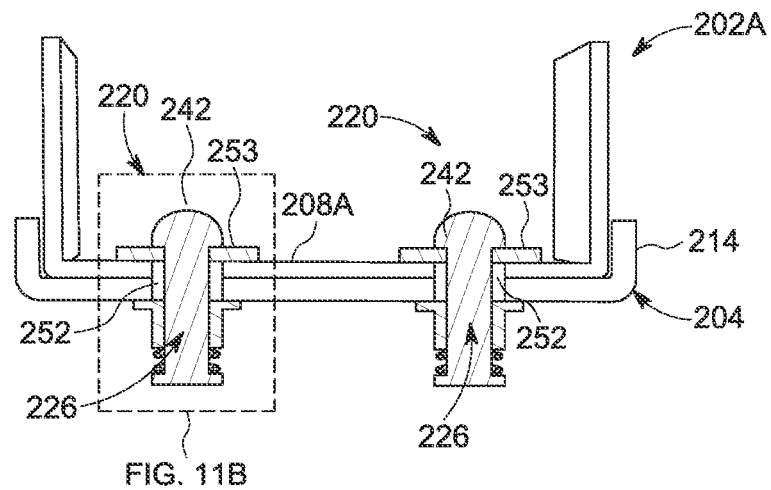
FIG. 9 is a cross section taken through the cable tray assembly of FIG. 8.
Figure 11A:
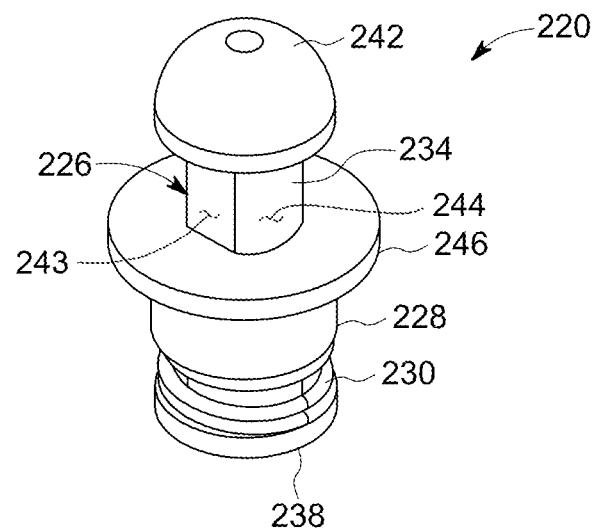
FIG. 11A is an enlarged perspective of a splice fastener of the cable tray assemble of FIG. 8.
Figure 11B:
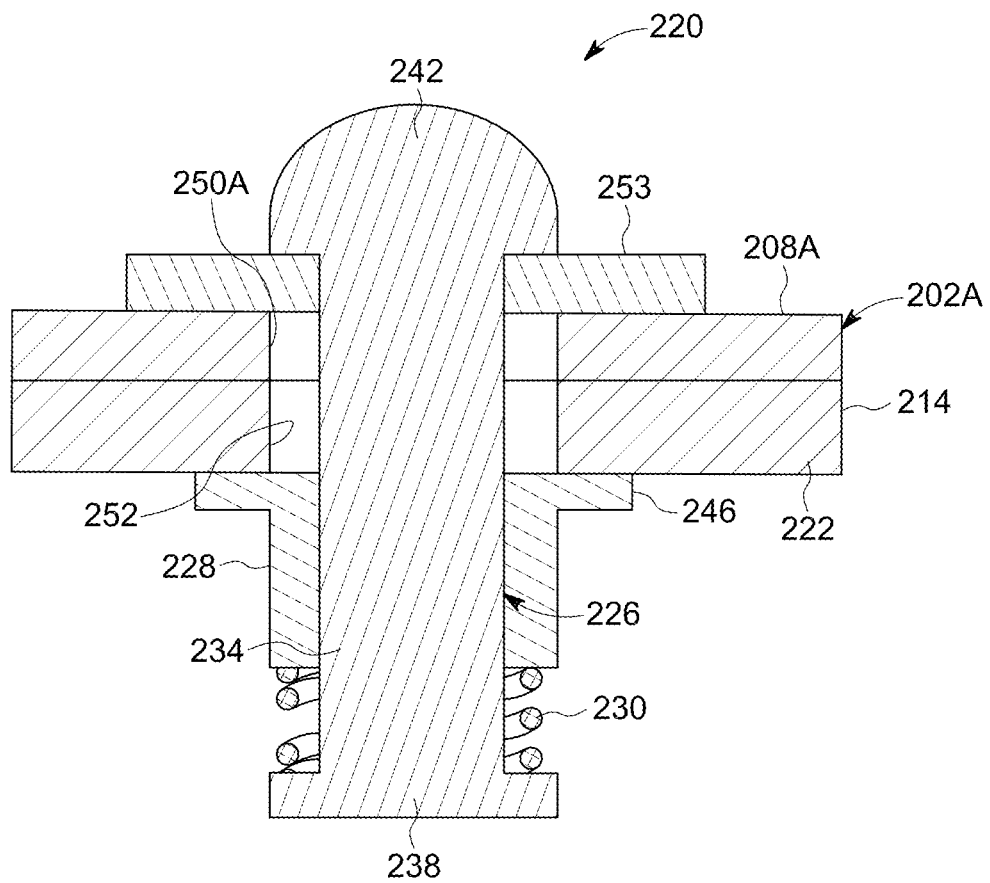
FIG. 11B is an enlarged, detail view as indicated in FIG. 9.

As seen best in FIGS. 9, 11A, and 11B, each fastener 220 in this embodiment is a quick-connect fastener and a twist-lock fastener, as explained below. The fastener 220 includes a stem, generally indicated at 226, a collar 228 received on the stem and axially slidable along the length of the stem, and a spring 230 (or other biasing element) configured to bias the collar in a locked position. The stem 226 has a length and includes a stem body 234 extending axially along its length. A lower flange 238 extends laterally outward from a lower end portion of the stem body 234. A head 242 at an upper portion of the stem body 234 has button-shape or other shape with a laterally extending flange.

The collar 228 is slidably received on the stem body 234 between the lower flange 238 and the head 242. The illustrated collar 128 includes an upper flange 246, although the collar may have a uniform diameter in other embodiments. The spring 230 (e.g., compression spring) engages a lower portion of the collar and the lower flange 230 to produce a biasing force biasing the collar 228 in an upward, locked position, whereby when coupling a splice plate 214 to cable tray sections 202A, 202B, the splice plate and cable tray section are sandwiched between the head 242 and the collar 228 (e.g., the flange 246 of the collar), as seen best in FIG. 11B.

Figure 10:
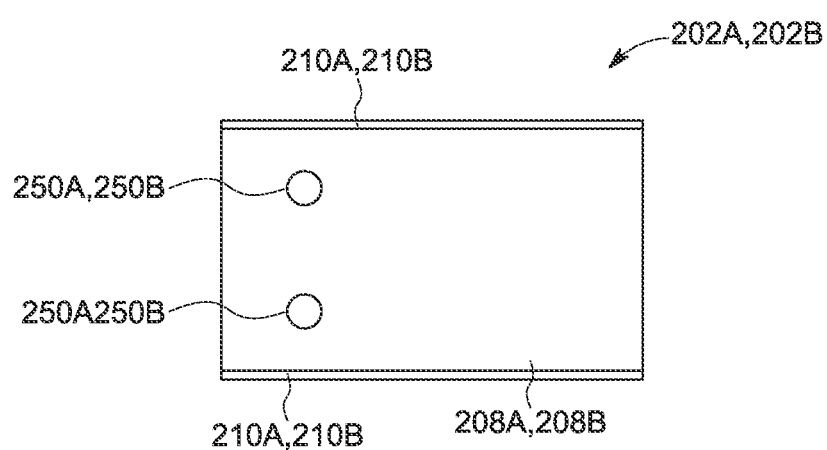
FIG. 10 is a top plan view of one of the cable tray sections of FIG. 8.
Figure 12:
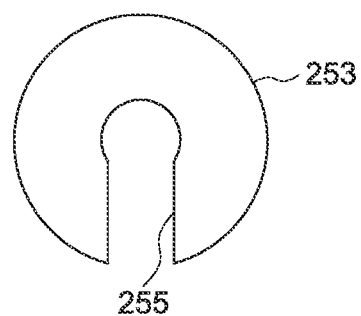
FIG. 12 is an enlarged top plan view of a slotted C-washer for the second embodiment of the cable tray splice.
Figure 13:
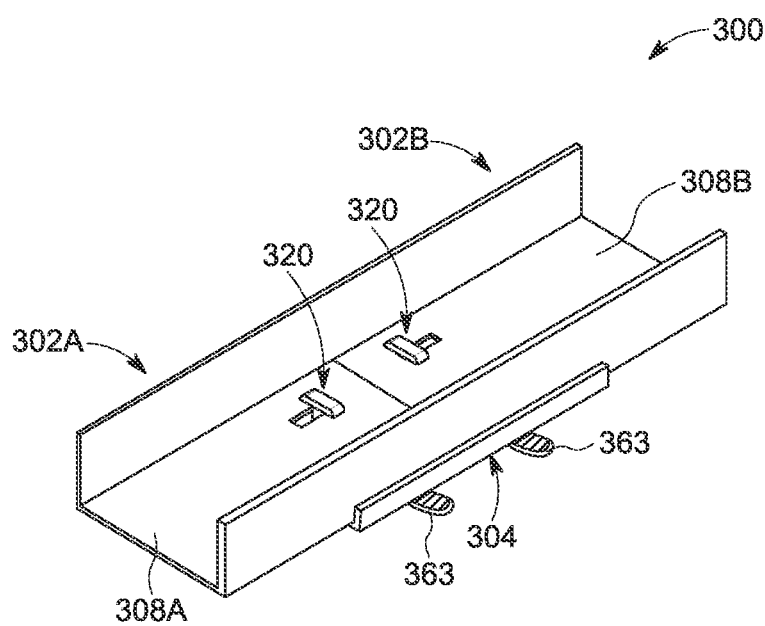
FIG. 13 is a perspective of a third embodiment of a cable tray assembly including a third embodiment of a cable tray splice.
Figure 14:
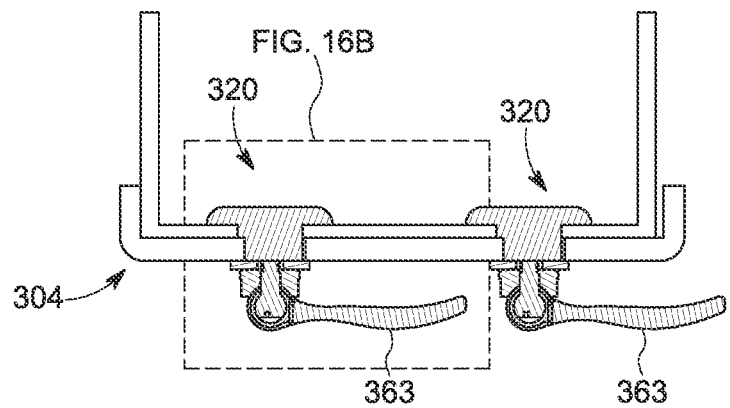
FIG. 14 is a cross section of the cable tray assembly of FIG. 13.

Coupling the splice plate 214 to the cable tray sections 202A, 202B is similar to the method described above with respect to the first embodiment, with the following notable differences. First, as shown in FIG. 10, rather than the keyhole-shapes of the openings 150A, 150B, the corresponding openings 250A, 250B of the present cable tray sections 202A, 202B are general circular, although they may be other shapes. Moreover, the diameter of the head 242 of the fastener 220 is less than the diameters of the openings 250A, 250B, such that the head 242 and stem body 234 are insertable into the opening 250A, 250B in any orientation. Similar to the first embodiment, the fastener 220 is inserted through the opening 252 in the bottom 222 of the splice plate 214 and then through the opening 250A, 250B in the bottom 208A, 208B of the corresponding cable tray section 202A, 202B. As the head 242 of the fastener 220 exits the aligned openings 252 and 250A, 250B and clears the upper or inner surface of the bottom wall 208A, 208B, the collar 228 (e.g., the flange 246) engages the lower or outer surface of the splice plate 214 and slides downward on the stem body 234 against the biasing force of the spring 230. Once the head 122 is through the openings 252 and 250A, 250B and above the bottom wall 208A, 208B, a slotted C-washer 253 is slid under the head such that the stem 226 (e.g., stem body 234) below the head is received in the slot of the slotted C-washer, as shown in FIGS. 9 and 11B. In particular, as shown in FIG. 12, the illustrated slot 255 of the C-washer has a keyhole shape with a rounded end portion. The stem 226 is received in the rounded end portion of the slot 255, and then the stem is rotated about its axis, such as 90 degrees about its axis. The 226 stem has rounded longitudinal sides 244 which fit snugly within the enlarged rounded end of the keyhole opening 250A, 250B as the stem is rotated to thereby "lock" the stem in the keyhole opening by virtue of the corresponding shapes of the upper shoulder stem and the enlarged rounded end of the keyhole opening inhibiting the stem and the fastener from moving out of the enlarged rounded end of the keyhole opening and sliding or moving lengthwise of the cable tray sections 202A, 202B. This is similar to the twist-locking action of the first fasteners 120, except the keyhole opening 255 is provided in the separate washer 253 rather than being defined by the bottom wall 208A, 208B of the cable tray section 202A, 202B.

Third Embodiment

Figure 15:
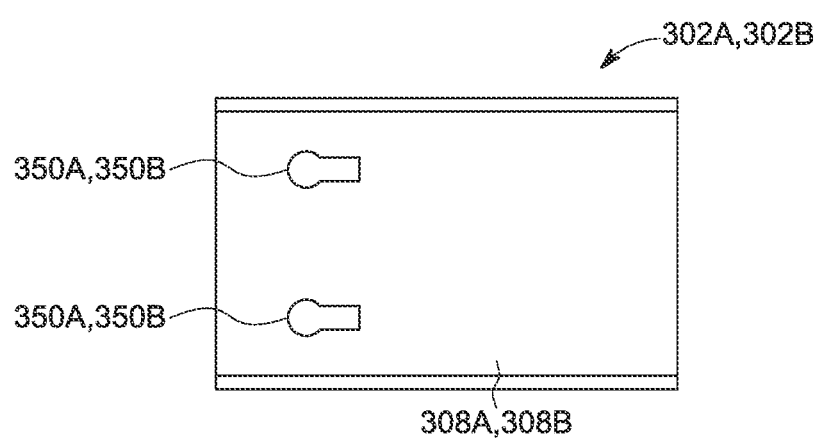
FIG. 15 is a top plan view of one of the cable tray sections of FIG. 13.

Referring to FIGS. 13-16B, a third embodiment of a cable tray assembly is generally indicated at reference numeral 300. The cable tray assembly 300 is similar to the first cable tray assembly 100, other than the cable tray assembly includes different fasteners, each generally indicated 320. Other than this difference, the cable tray assemblies 100, 300 may be identical with identical and similar components indicated by corresponding reference numeral plus 200. As shown in FIG. 15, the cable tray sections 302A, 302B are the same as the cable tray sections 102A, 102B, including the keyhole openings 350A, 350B.

Figure 16A:
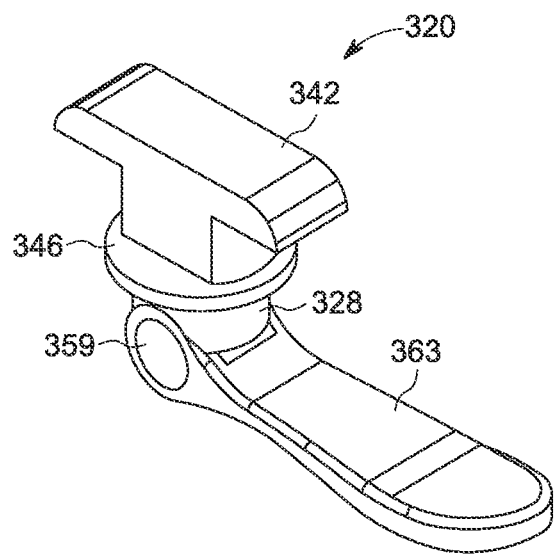
FIG. 16A is an enlarged perspective of a splice fastener of the third embodiment of the cable tray splice.
Figure 16B:
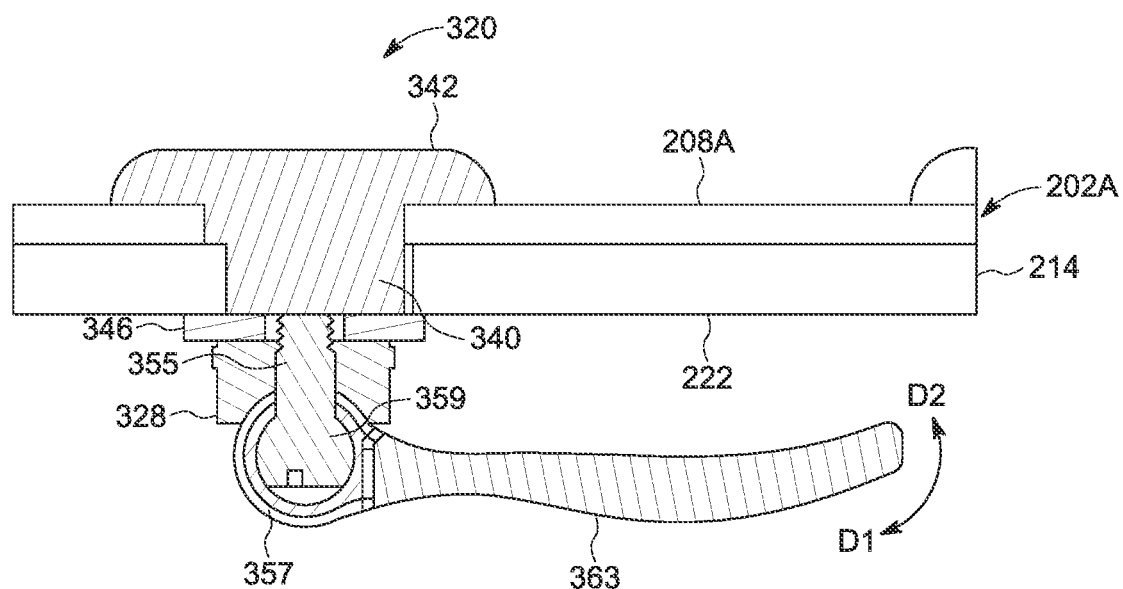
FIG. 16B is an enlarged detail view as indicated in FIG. 14.
Figure 17:
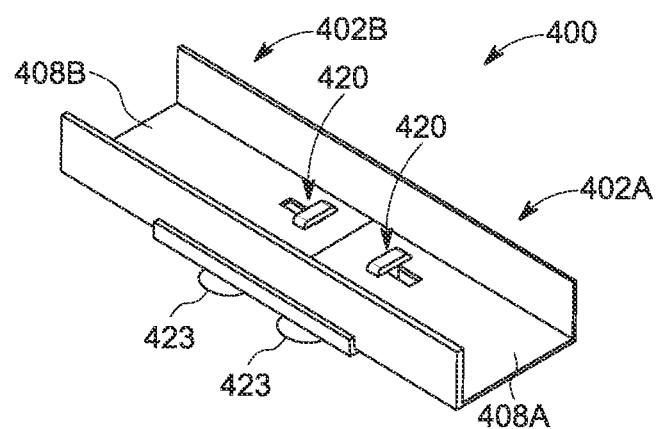
FIG. 17 is a perspective of a fourth embodiment of a cable tray assembly including a fourth embodiment of a cable tray splice.

As seen best in FIGS. 16A and 16B, each fastener 320 in this embodiment is a quick-connect fastener and a twist-lock fastener, as explained below. However, rather than the spring 130 biasing the collar 128 in a locked position, as in the first embodiment, the present fastener 320 includes a cam-lock for locking the fastener to inhibit rotation relative to the cable tray section 302A, 302B. A head 342 and an upper shoulder 340 are the same as the head 142 and the upper shoulder 140 of the first fastener 120. A collar 328 is similar to the collar 128 and includes an upper flange 346 similar to the upper flange 146. The collar 328 is received on a stem 355 and is axially slidable along the length of the stem. A cam 357 is rotatably received on a lower pin 359 of the stem to allow the cam 357 to rotate about the lower head. A handle 363 is coupled to the cam 357 to actuate locking and unlocking of the cam fastener 320. In particular, rotating the cam 357 and the handle 363 in a first direction D1 unlocks the fastener 320, whereby the collar 328 is movable away from the head 342 and upper shoulder 340. Rotating the cam 357 and the handle 363 in an opposite section direction D2 locks the fastener 320, whereby the lower portion of the collar 328 rides on the cam (e.g., acts as a cam follower) to impart upward sliding movement of the collar on the stem toward the upper shoulder 340.

As can be understood from the drawings and the teachings of the first fastener 120, the present fastener 320 couples the splice plate 314 to the cable tray sections 302A, 302A similar to the first fastener 120 other than the fact that the present fastener includes the cam-lock feature. Accordingly, the method of using the present fastener 320 is the same as the first fastener up to and including the step of rotating the head 342 and/or upper shoulder 340 relative to the cable tray section 202A, 202B to lock the fastener in the keyhole opening 250A, 250B. Up to an including this step, the cam is unlocked. After this step, the cam 357 and the handle 363 are rotated in the locking direction D2 to push the collar 328 against the bottom wall 322 of the splice plate 314 and sandwich the bottom walls 308A, 308B and 322 between the head 342 and the flange 346 of the collar 328. The cam can be unlocked after locking to unlock the fastener 320.

Fourth Embodiment

Figure 18:
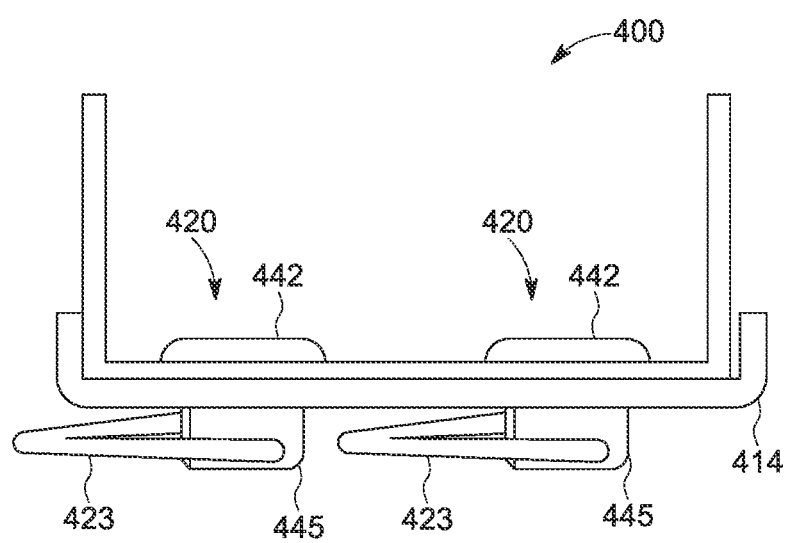
FIG. 18 is front elevation of the cable tray assembly of FIG. 17.
Figure 19:
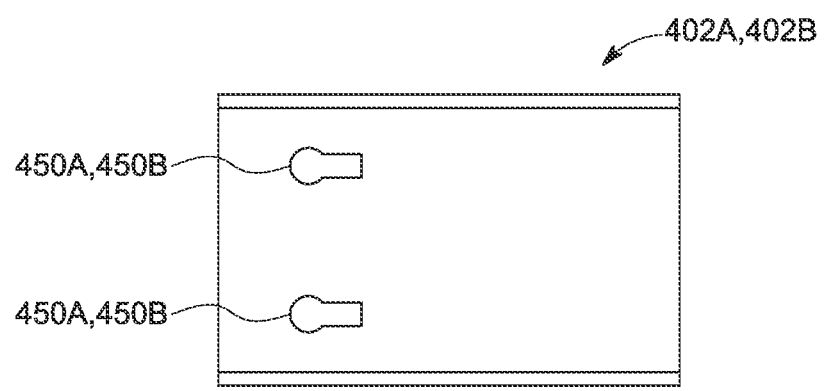
FIG. 19 is a top plan view of one of the cable tray sections of FIG. 17.

Referring to FIGS. 17-21, a fourth embodiment of a cable tray assembly is generally indicated at reference numeral 400. The cable tray assembly 400 is similar to the first cable tray assembly 100, other than the cable tray assembly includes different fasteners, each generally indicated 420. Other than this difference, the cable tray assemblies 100, 400 may be identical with identical and similar components indicated by corresponding reference numeral plus 300. As shown in FIG. 19, the cable tray sections 402A, 402B are the same as the cable tray sections 102A, 102B, including the keyhole openings 450A, 450B.

Figure 20:
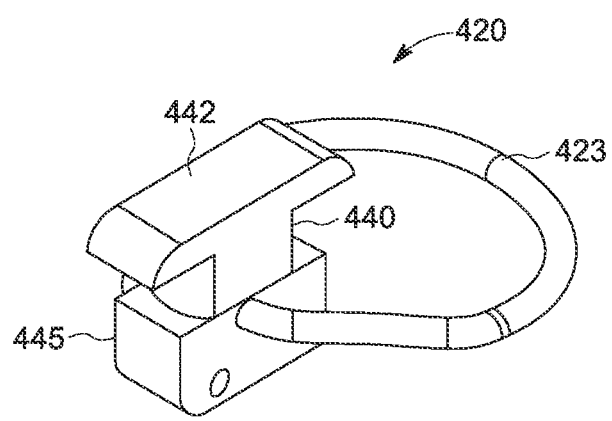
FIG. 20 is an enlarged perspective of a splice fastener of the fourth embodiment of the cable tray splice.
Figure 21:
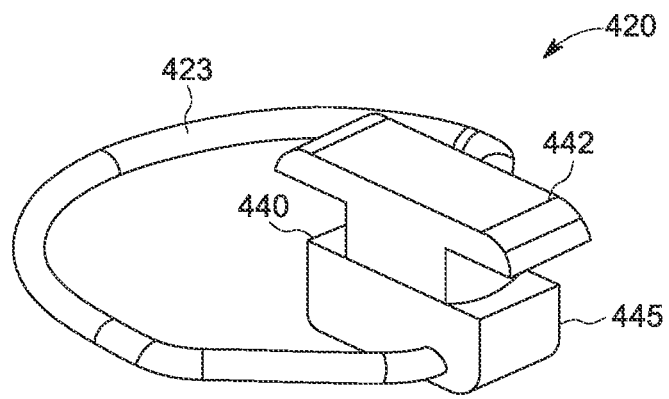
FIG. 21 another enlarged perspective of a splice fastener of the fourth embodiment of the cable tray splice.

As seen best in FIGS. 18, 20, and 21, each fastener 420 in this embodiment is a quick-connect fastener and a twist-lock fastener, as explained below. However, rather than the spring 130 biasing the collar 128 in a locked position, as in the first embodiment, the present fastener 420 includes an external spring 423 for locking the fastener to inhibit rotation relative to the cable tray section 402A, 402B. A head 442 and an upper shoulder 440 are the same as the head 142 and the upper shoulder 140 of the first fastener 120. However, the fastener 420 does not include the other components of the fasteners 120. Instead, the fastener 420 includes a shoulder base 445 at the lower end of the upper shoulder 440 generally opposing the head 442. The illustrated spring 423 is in the form of a resilient wire having a first end fixedly coupled to one side of the base 445 (or other portion of the fastener) and a second end removably coupled to the other side of the base (or other portion of the fastener).

As can be understood from the drawings and the teachings of the first fastener 120, the present fastener 420 couples the splice plate 414 to the cable tray sections 402A, 402A similar to the first fastener 120 other than the fact that the present fastener does not have a slidable collar or a stem. Accordingly, the method of using the present fastener 420 is the same as the first fastener up to and including the step of rotating the head 442 and/or upper shoulder 440 relative to the cable tray section 402A, 402B to lock the fastener in the keyhole opening 450A, 450B. After this step, the removable end of the spring 423 is removed from the base 423 so that the spring pushes against the bottom wall 422 of the splice plate 414 and the bottom walls 408A, 408B and 422 are sandwiched between the head 442 and the shoulder base 445. Other types of springs may be used.

Fifth Embodiment

Figure 22:
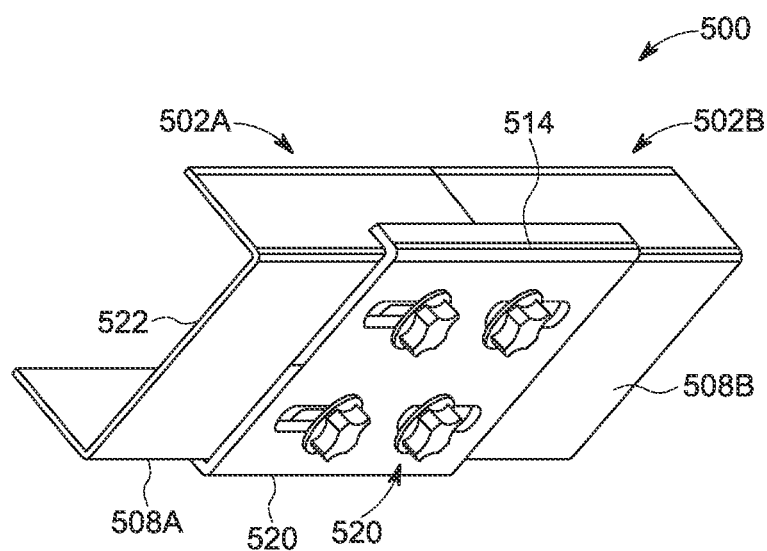
FIG. 22 bottom perspective of a fifth embodiment of a cable tray assembly including a fifth embodiment of a cable tray splice.
Figure 23:
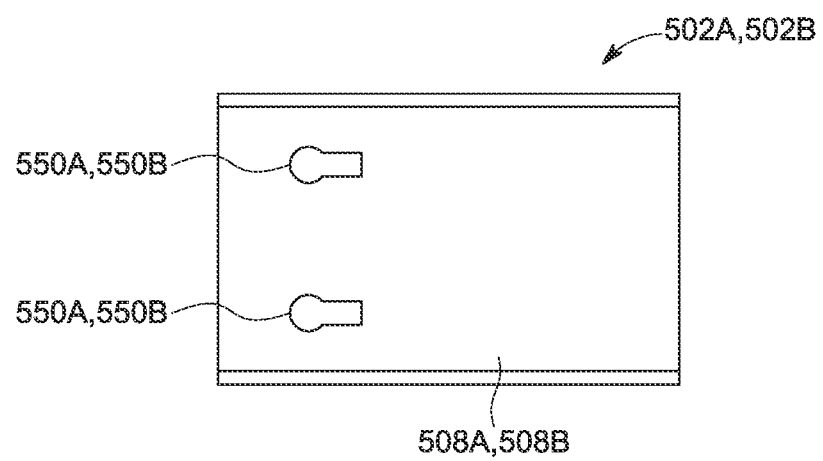
FIG. 23 is a top plan view of one of the cable tray sections of FIG. 22.
Figure 24:
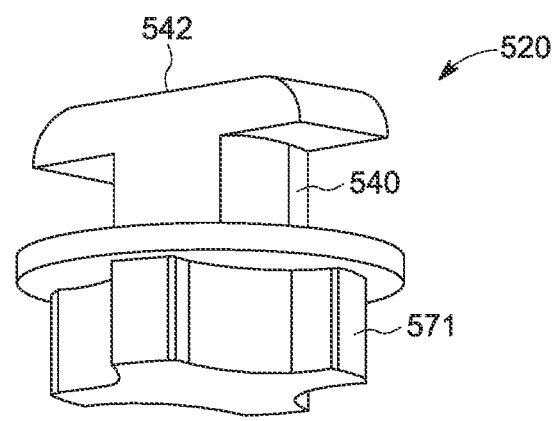
FIG. 24 is an enlarged perspective of a splice fastener of the fifth embodiment of the cable tray splice.

Referring to FIGS. 22-24, a fifth embodiment of a cable tray assembly is generally indicated at reference numeral 500. The cable tray assembly 500 is similar to the fourth cable tray assembly 100, other than the cable tray assembly includes different fasteners, each generally indicated 520. Other than this difference, the cable tray assemblies 100, 500 may be identical with identical and similar components indicated by like reference numeral plus 400. As shown in FIG. 23, the cable tray sections 502A, 502B are the same as the cable tray sections 102A, 102B, including the keyhole openings 550A, 550B.

As seen best in FIG. 24, each fastener 420 in this embodiment is a quick-connect fastener and a twist-lock fastener, as explained below. However, rather than the shoulder base 445 and the spring 423, as in the fourth embodiment, the present fastener 520 includes a lower flanged nut 571 threaded on a threaded stem or shaft (not shown) configured to lock the fastener to inhibit rotation relative to the cable tray section 502A, 502B. A head 542 and an upper shoulder 540 are the same as the head 442 and the upper shoulder 440 of the first fastener 420. However, the fastener 520 does not include the other components of the fastener 420.

As can be understood from the drawings and the teachings of the first fastener 120, the present fastener 520 couples the splice plate 514 to the cable tray sections 502A, 502A similar to the first fastener 120 other than the fact that the present fastener does not have a slidable collar or stem. Accordingly, the method of using the present fastener 520 is the same as the first fastener up to and including the step of rotating the head 542 and/or upper shoulder 540 relative to the cable tray section 502A, 502B to lock the fastener in the keyhole opening 550A, 550B. After this step, the flanged nut 571 is tightened to press against the bottom wall 522 of the splice plate 514 and the bottom walls 508A, 508B and 522 are sandwiched between the head 542 and the shoulder base 545.

Sixth Embodiment

Figure 25:
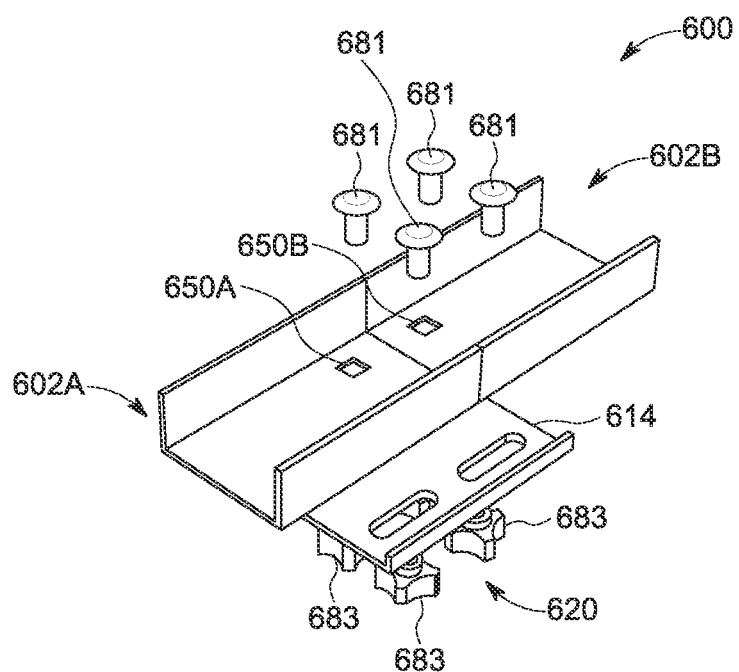
FIG. 25 an exploded perspective of a sixth embodiment of a cable tray assembly including a sixth embodiment of a cable tray splice.
Figure 26:
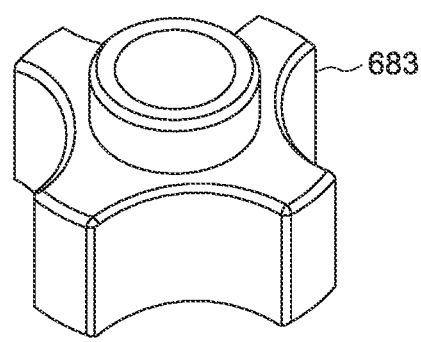
FIG. 26 is a nut with a knob for a fastener of the sixth embodiment of the cable tray splice.
Figure 27:
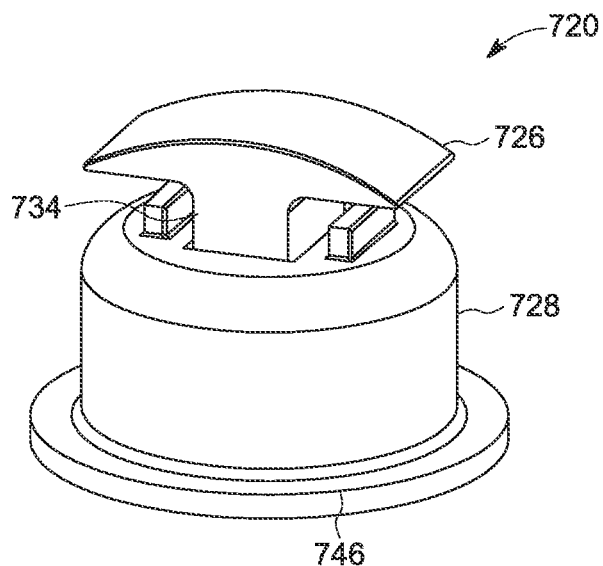
FIG. 27 is an enlarged perspective of the splice fastener of the seventh embodiment of the cable tray splice.
Figure 28:
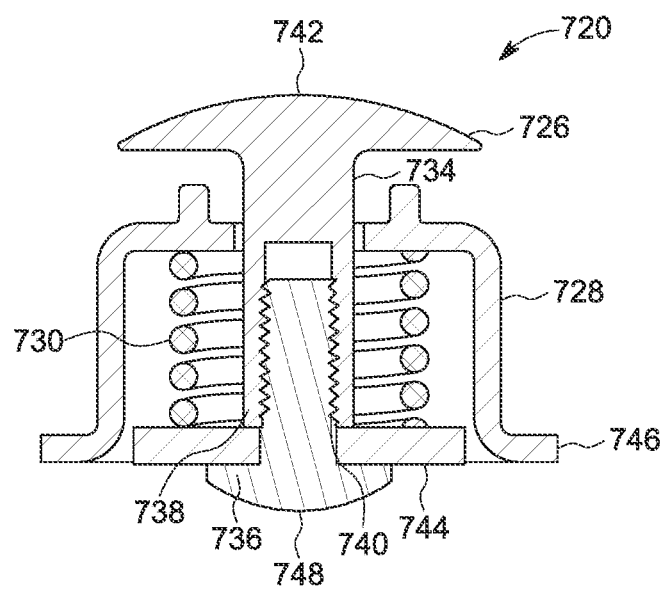
FIG. 28 is a cross section of FIG. 27.
Figure 29:
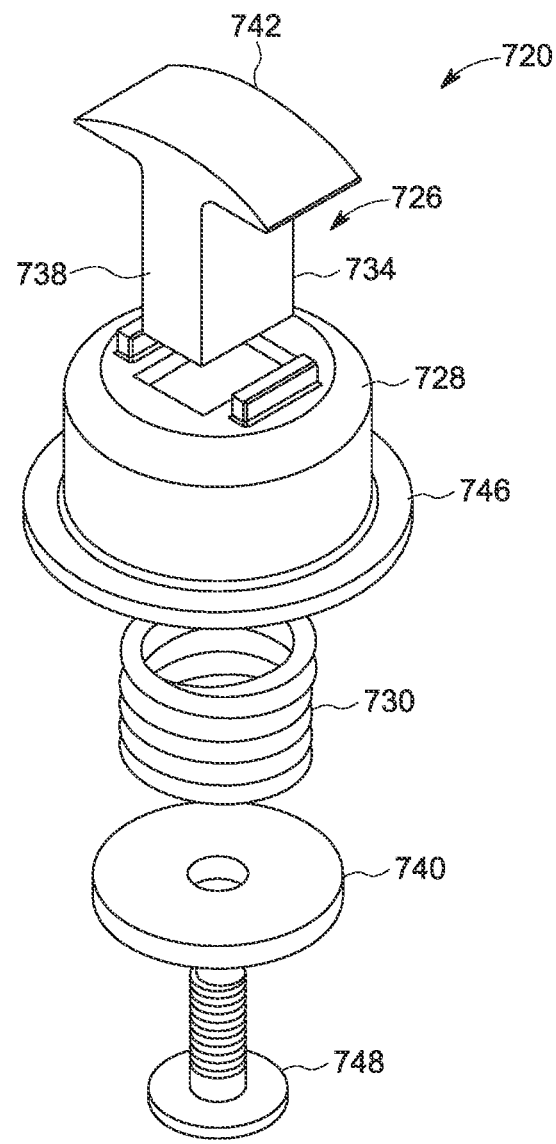
FIG. 29 is an exploded perspective of the seventh embodiment of the cable tray splice.

Referring to FIGS. 25 and 26, a sixth embodiment of a cable tray assembly is generally indicated at reference numeral 600. The cable tray assembly 600 is similar to the fifth cable tray assembly 500, other than the cable tray assembly includes different fasteners, each generally indicated at 620, and different openings 650A, 650B in the cable tray sections 602A, 602B. Other than this difference, the cable tray assemblies 500, 600 may be identical with identical and similar components indicated by like reference numeral plus 500.

As seen best in FIG. 24, each fastener 620 in this embodiment includes a shoulder bolt 681 (e.g., a bolt having a square shoulder) and a nut 683 (e.g., a nut with a knob) threadable on the shoulder bolt. As can be understood from the drawings and the teachings of the fifth fastener 520, the present fastener 620 couples the splice plate 614 to the cable tray sections 602A, 602A by inserting the shoulder bolts 681 into the openings 650A, 650B and then threading and tightening the nuts 683 onto the bolts at lower ends thereof.

Seventh Embodiment

Referring to FIGS. 27-30, a seventh embodiment of a fastener for a cable tray assembly is generally indicated at reference numeral 720. The fastener 720 may be used with the same type of cable tray in the previous embodiment to form a cable tray assembly. In the illustrated embodiment, the openings 750A, 750B in the cable tray sections 702A, 702B and the splice plate 714 are generally elongate, such as rectangular, and having lengths extending along the lengths of the cable tray sections 702A 702B, although the openings may be other shapes and other orientations.

The fastener 720 includes a stem, generally indicated at 726, a collar 728 received on the stem and axially slidable along the length of the stem, and a spring 730 (or other biasing element) configured to bias the collar in a locked position. The stem 726 has a length and includes a stem body 734 extending axially along its length. The stem body 734 defines an opening 736 at a lower portion 738 thereof. The opening 736 has female threads 740 located within the opening 736. Bolt 748 contains male threads thereon that mate with female threads 740 of the stem 726.

A head 742 at an upper portion of the stem 734 has button-shape or other shape with a laterally extending flange.

Figure 30A:
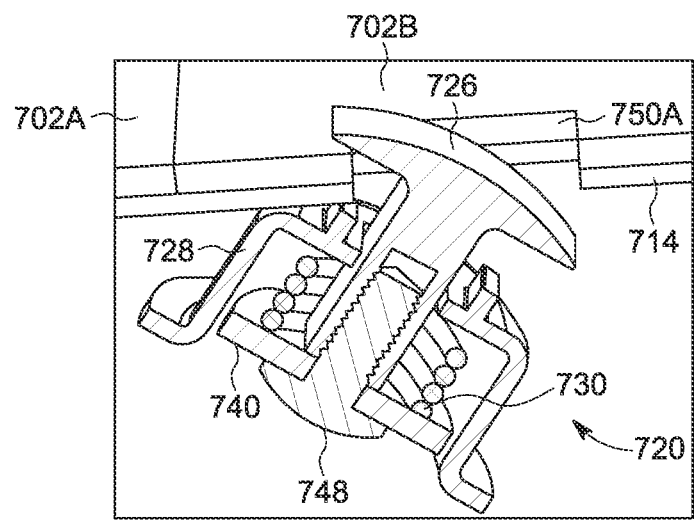
FIG. 30A is a perspective cross-section of the cable tray splice at the start of insertion into the cable tray assembly.
Figure 30B:
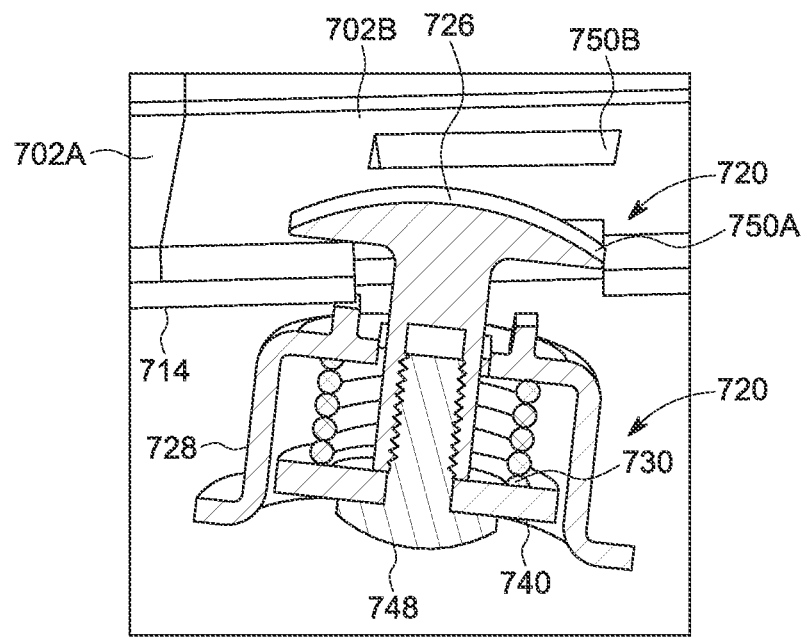
FIG. 30B is a perspective cross-section of the cable tray splice during insertion into the cable tray assembly.
Figure 30C:
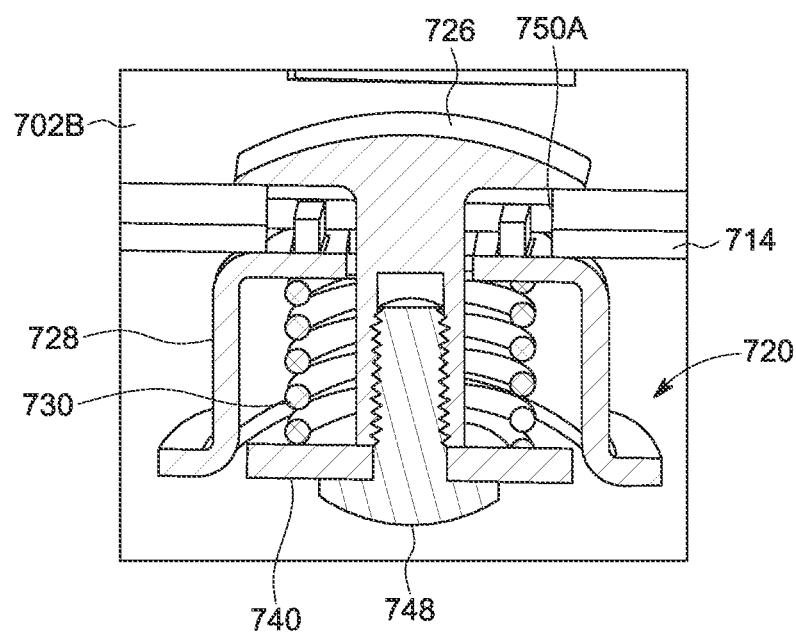
FIG. 30C is a perspective cross-section of the cable tray splice after insertion into the cable tray assembly.

The collar 728 is slidably received on the stem body 734 between a lower spacer (e.g., washer) 740 and the head 742. The illustrated collar 728 includes a lower flange 246, although the collar may have a uniform diameter in other embodiments. The spring 730 (e.g., compression spring) engages an upper portion of the collar 728 and the washer 740 to produce a biasing force biasing the collar 728 in an upward, locked position, whereby when coupling a splice plate 714 to cable tray sections 750A, 750B, the splice plate and cable tray section are sandwiched between the head 742 and the collar 728 (e.g., upper portion of the collar), as seen best in FIGS. 30A-30C. In particular, FIG. 30A illustrates the head 742 of stem 726 being inserted through a cable tray opening 750A. FIG. 30B illustrates the head 742 of the stem 726 being passed through the cable tray opening 750A. Finally, FIG. 30C illustrates the fastener 720 positioned in the cable tray opening 750A. At this stage, the spring 730 pushes collar 728 upward so that it is directly adjacent the cable tray assembly.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray assembly comprising:
    a first cable tray section including a bottom wall;
    a second cable tray section adjacent the first cable tray and including a bottom wall defining a keyhole opening having a rectilinear portion and an enlarged rounded end portion;
    a cable tray splice defining openings; and
    male twist-lock fasteners received in the respective keyhole openings of the first and second cable tray sections and the openings of the cable tray splice to couple the cable tray splice to the bottom walls of the first and second cable tray sections, whereby the first and second cable tray sections are spliced together to form the cable tray assembly, each of the male twist-lock fasteners comprising a stem body having upper and lower portions, wherein the upper portion of the stem body has opposite rounded longitudinal ends and opposite flat side ends, wherein the opposite rounded longitudinal ends are configured to fit snugly within the enlarged rounded end of the keyhole opening by rotating the stem body in the keyhole opening.

2. The cable tray assembly set forth in claim 1, wherein the cable tray splice comprises a splice body engaging outer surfaces of the bottom walls of the first and second cable tray sections, wherein each of the male twist-lock fasteners includes a spring producing a biasing force against the splice body to inhibit movement of the cable tray splice relative to the first and second cable tray sections.

3. The cable tray assembly set forth in claim 2, wherein the splice body comprises a bottom wall configured to oppose in face-to-face engagement with the bottom walls of the first and second cable tray sections.

4. The cable tray splice set forth in claim 3, wherein the first and second cable tray sections comprise opposing side walls and the splice body comprises opposing side walls configured to oppose corresponding opposing side walls of the first and second cable tray sections.

5. A cable tray splice for splicing together cable tray sections to form a cable tray assembly, the cable tray splice comprising:
    a splice body configured to engage adjacent cable tray sections, wherein the splice body defines at least two keyhole openings, the keyhole openings each having a rectilinear portion and an enlarged rounded end portion; and
    at least two fasteners configured to be inserted into the respective at least two openings to couple the splice body to the adjacent cable tray sections, wherein each of the fasteners includes a spring producing a biasing force against the splice body to inhibit movement of the cable tray splice relative to the adjacent cable tray sections,
    wherein each of the least two fasteners comprises a stem and a collar received on the stem and axially slidable along a length of the stem, the stem comprising a stem body having upper and lower portions, wherein the upper portion of the stem body has opposite rounded longitudinal ends and opposite flat side ends, wherein the opposite rounded longitudinal ends are configured to fit snugly within the enlarged rounded end of the keyhole opening as the stem is rotated in the keyhole opening.

6. The cable tray splice set forth in claim 5, wherein the stem further comprises an upper shoulder having an elongate shape extending laterally outward from the upper portion of the stem body, wherein a lower portion of the upper shoulder defines the opposite rounded longitudinal ends and opposite flat side ends, wherein the upper shoulder further comprises a head at an upper portion of the upper shoulder, the head comprising an elongate shape with a length extending laterally outward from longitudinal ends of the upper shoulder.

7. The cable tray splice set forth in claim 6, wherein the stem comprises a lower flange extending laterally outward from the lower end portion of the stem body.

8. The cable tray splice set forth in claim 7, wherein the collar is slidably received on the stem body between the lower flange and the upper shoulder.

9. The cable tray splice set forth in claim 5, wherein the splice body is configured to engage adjacent cable tray sections on bottom walls of the adjacent cable tray sections to splice the adjacent cable tray sections together.

10. The cable tray splice set forth in claim 9, wherein the splice body comprises a bottom wall configured to oppose surfaces of the bottom walls of the adjacent cable tray sections.

11. The cable tray splice set forth in claim 10, wherein the bottom wall of the splice body is configured to oppose in face-to-face engagement with the bottom walls of the adjacent cable tray sections.

12. The cable tray splice set forth in claim 10, wherein the adjacent cable tray sections comprise opposing side walls wherein the splice body further comprises opposing side walls configured to oppose corresponding side walls of the adjacent cable tray sections.

13. The cable tray splice set forth in claim 10, wherein at least one fastener is configured to be a male twist-lock insertable through respective openings in the bottom walls of the splice body and adjacent cable tray sections.

14. The cable tray splice set forth in claim 5, wherein the at least two fasteners are quick-connect fasteners configured to quickly lock the splice body onto the adjacent cable tray sections.

15. A method of splicing together two cable tray sections to form a cable tray assembly using the cable tray splice set forth in claim 5, the method comprising:
  positioning the two cable tray sections end-to-end;
  positioning the splice body on bottom walls of the two cable tray sections; and
  inserting a fastener of the at least two fasteners through aligned openings in the splice body and the bottom walls of the two cable tray sections,
  wherein after said inserting, a spring biasing force is applied to the splice body to inhibit the fastener from moving relative to the splice body.

16. The method as set forth in claim 15, further comprising locking the fastener to inhibit rotation relative to the two cable tray section.

\* \* \* \* \*